(12) United States Patent
Kamiya (10) Patent No.: US 9,701,050 B2
(45) Date of Patent: Jul. 11, 2017

(54) METHOD OF MANUFACTURING RESIN MOLDED MEMBER

(71) Applicant: TOYOTA BOSHOKU KABUSHIKI KAISHA, Aichi-ken (JP)

(72) Inventor: Hideo Kamiya, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 450 days.

(21) Appl. No.: 14/456,242

(22) Filed: Aug. 11, 2014

(65) Prior Publication Data

US 2015/0084227 A1    Mar. 26, 2015

(30) Foreign Application Priority Data

Sep. 25, 2013 (JP) ................. 2013-198447

(51) Int. Cl.
| | | |
|---|---|---|
| *B29C 45/14* | (2006.01) | |
| *B29K 23/00* | (2006.01) | |
| *B29K 77/00* | (2006.01) | |
| *B29K 105/08* | (2006.01) | |

(52) U.S. Cl.
CPC .. *B29C 45/14221* (2013.01); *B29C 45/14786* (2013.01); *B29K 2023/12* (2013.01); *B29K 2077/00* (2013.01); *B29K 2105/0872* (2013.01)

(58) Field of Classification Search
CPC .............................................. B29C 2045/0086
USPC ................................................ 264/163, 46.5
See application file for complete search history.

(56) References Cited

U.S. PATENT DOCUMENTS

| | | | |
|---|---|---|---|
| 3,184,096 A | * | 5/1965 | Cheeley ............ B29C 45/14221 220/260 |
| 4,860,425 A | | 8/1989 | Kunisaki et al. |
| 2005/0127564 A1 | | 6/2005 | Van Der Aa et al. |

FOREIGN PATENT DOCUMENTS

| | | |
|---|---|---|
| DE | 102011054287 | 4/2013 |
| JP | 64-55218 | 3/1989 |
| JP | 2005-001314 | 1/2005 |
| JP | 2009-113244 | 5/2009 |

(Continued)

OTHER PUBLICATIONS

Japanese Office Action for JP App. No. 2013-198447 mailed on Nov. 22, 2016, along with English-language translation thereof.

(Continued)

*Primary Examiner* — Matthew Daniels
*Assistant Examiner* — Baileigh K Darnell
(74) *Attorney, Agent, or Firm* — Greenblum & Bernstein, P.L.C.

(57) ABSTRACT

A method of manufacturing a resin molded member having a recess includes a press molding process and an injection molding process. The press molding process includes placing a flat plate shaped molding material containing fibers and a thermoplastic resin between dies in pair one having a die projection and another having a die recess, moving at least one of the dies, cutting the molding material by a shearing action of the dies caused by the moving, and pressing the molding material between the dies by the moving. The injection molding process includes injecting a melted resin into a molding space that is formed between the dies after the cutting of the molding material, and molding a wall portion having the recess out of the injected resin so as to be integral with at least one part of the molding material that is cut off in the cutting.

13 Claims, 11 Drawing Sheets

(56) References Cited

FOREIGN PATENT DOCUMENTS

| JP | 2009-113548 | | 5/2009 |
|----|----|----|----|
| JP | 2009113244 A | * | 5/2009 |
| JP | 2013-095093 | | 5/2013 |

OTHER PUBLICATIONS

German Official Action for DE 10 2014 217 554.2 having a mailing date of Apr. 16, 2015, along with an English translation thereof.

* cited by examiner

METHOD OF MANUFACTURING RESIN MOLDED MEMBER

CROSS REFERENCE TO RELATED APPLICATION

This application claims priority from Japanese Patent Application No. 2013-198447 filed on Sep. 25, 2013. The entire contents of the priority application are incorporated herein by reference.

FIELD OF THE INVENTION

The present disclosure relates to a method of manufacturing a resin molded member.

BACKGROUND OF THE INVENTION

According to an example of a method of manufacturing a resin molded member, a molding material containing a thermoplastic resin is molded into a base member (a molding base member) by a pair of dies (an upper die and a lower die).

SUMMARY OF THE INVENTION

An objective of the present technology is to provide a method of manufacturing a resin molded member with which a resin molded member having a recess is precisely molded.

According to the present technology, a method of manufacturing a resin molded member having a recess includes a press molding process and an injection molding process. The press molding process includes placing a flat plate shaped molding material containing fibers and a thermoplastic resin between dies in pair one having a die projection and another having a die recess, moving at least one of the dies, cutting the molding material by a shearing action of the dies caused by the moving, and pressing the molding material between the dies by the moving. The injection molding process includes injecting a melted resin into a molding space that is formed between the dies after the cutting of the molding material, and molding a wall portion having the recess out of the injected resin so as to be integral with at least one part of the molding material that is cut off in the cutting.

DETAILED DESCRIPTION OF EMBODIMENTS

Figure 10:
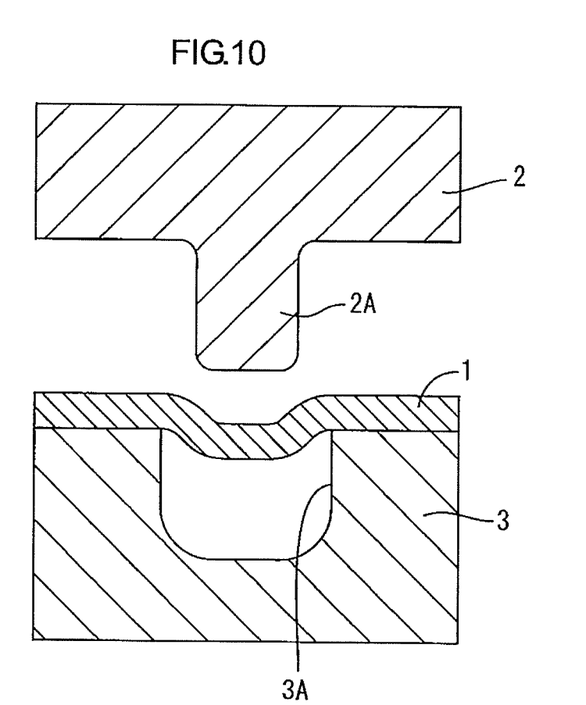
FIG. 10 is a cross-sectional view illustrating a method of manufacturing a resin molded member according to a related art (dies are in an open state).
Figure 11:
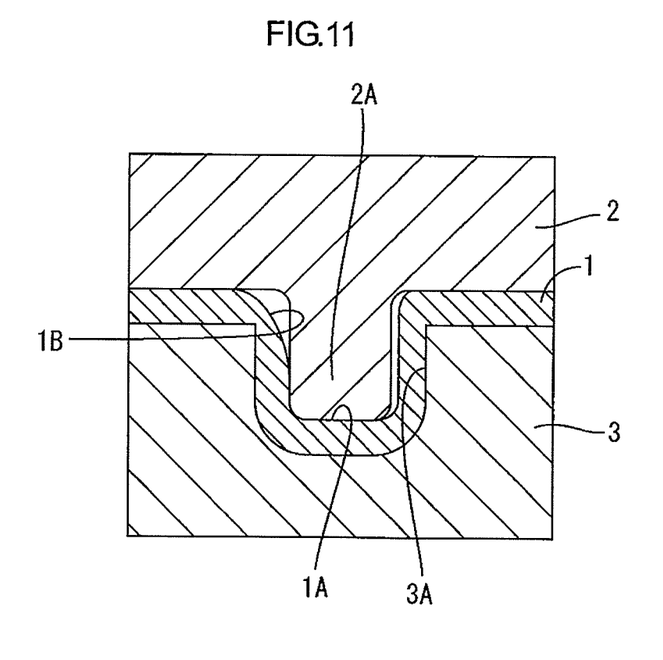
FIG. 11 is a cross-sectional view illustrating the method of manufacturing a resin molded member according to a related art (dies are in a closed state).

As illustrated in FIGS. 10 and 11, for example, in molding a base member by a pair of dies including an upper die 2 having a projection 2A and a lower die 3 having a recess 3A, the upper die 2 and the lower die 3 press a flat plate-shaped molding material 1 therebetween. A part of the molding material 1 is pressed by the projection 2A and a recess 1A is formed in the molding material 1 (deep drawing processing). As a result, the molding material 1 is molded into a base member having the recess 1A.

In forming the recess 1A, a part of the molding material 1 is pressed by the projection 2A into the recess 3A and this expands the part of the molding material 1. Accordingly, the part of the molding material 1 (including a thermoplastic resin) that includes the recess 1A has a lowered density, and the part of the molding material 1 near an edge portion 1B of the recess 1A having the lowered density may not be formed into a certain shape that follows the shape of the projection 2A (see FIG. 11).

Such a problem is likely to be caused when the recess 1A has a great depth. If the recess 1A has a great depth, a length of the molding material that is to be expanded becomes greater, and this lowers the density of the part of the molding material including the recess 1A.

First Embodiment

A first embodiment of the present technology will be described with reference to FIGS. 1 to 6. In this embodiment, a resin molded member 10 that is used as a vehicular interior part is described.

Figure 1:
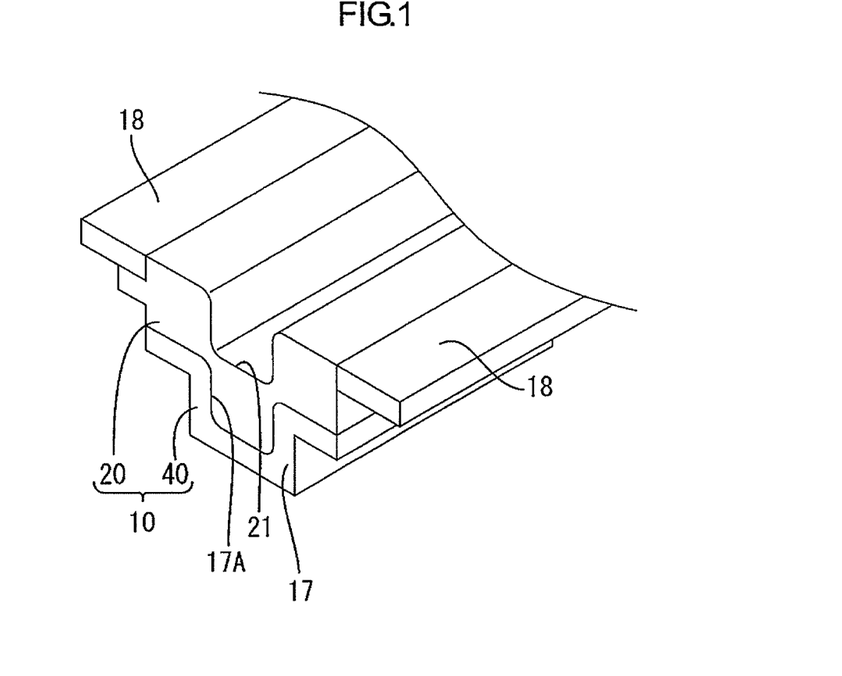
FIG. 1 is a perspective view illustrating a resin molded member according to a first embodiment of the present technology.
Figure 2:
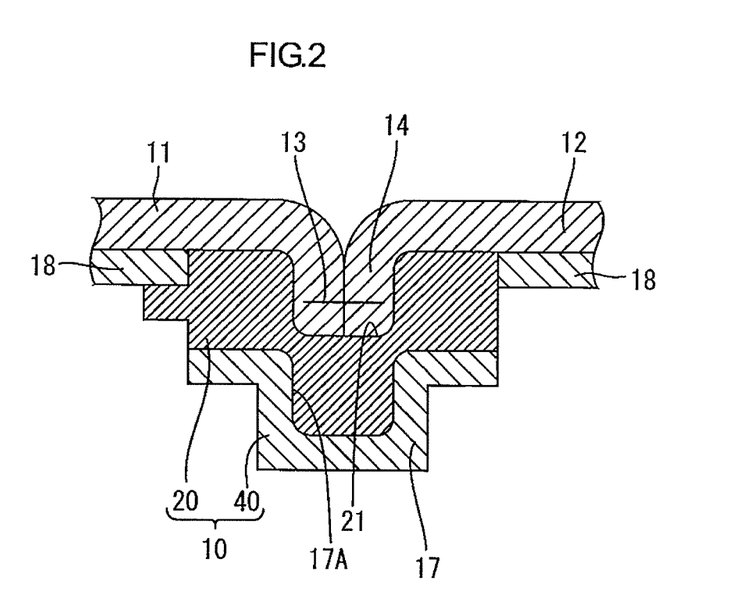
FIG. 2 is a cross-sectional view of the resin molded member illustrated in FIG. 1.

As illustrated in FIGS. 1 and 2, the resin molded member 10 has an elongated plate-like shape as a whole and includes a first molded member 20 and a second molded member 40. The first molded member 20 has a recess 21 that is open toward a front side (a design surface side), and the second molded member 40 is integrally molded with the first molded member 20. The first molded member 20 (an injection molded member) is molded by injecting a melted resin. The second molded member 40 (a press molded member) is molded by pressing a molding material 16 (see FIG. 3). The resin molded member 10 may be used as a base member of a vehicular interior part such as a door trim, an instrument panel, a sheet back board, a pillar garnish, and a quarter trim. However, it is not limited thereto.

The first molded member 20 is made of a thermoplastic resin such as polyamide or polypropylene. The second molded member 40 is made of a fiber and a thermoplastic resin that is impregnated into the fiber. Examples of the fiber include a wood fiber, a glass fiber, a carbon fiber, and examples of the thermoplastic resin include polyamide or polypropylene and the like.

As illustrated in FIG. 1, the first molded member 20 (a wall portion having a recess) has an elongated shape and the recess 21 extends in a longitudinal direction of the first molded member 20.

As illustrated in FIG. 2, skins 11, 12 are attached to a front surface of the resin molded member 10. The skins 11, 12 are overlapped with each other at their end portions and sewed with a string 13. Overlapped portions 14 of the skins 11, 12 are fitted to the recess 21 of the first molded member 20.

Figure 3:
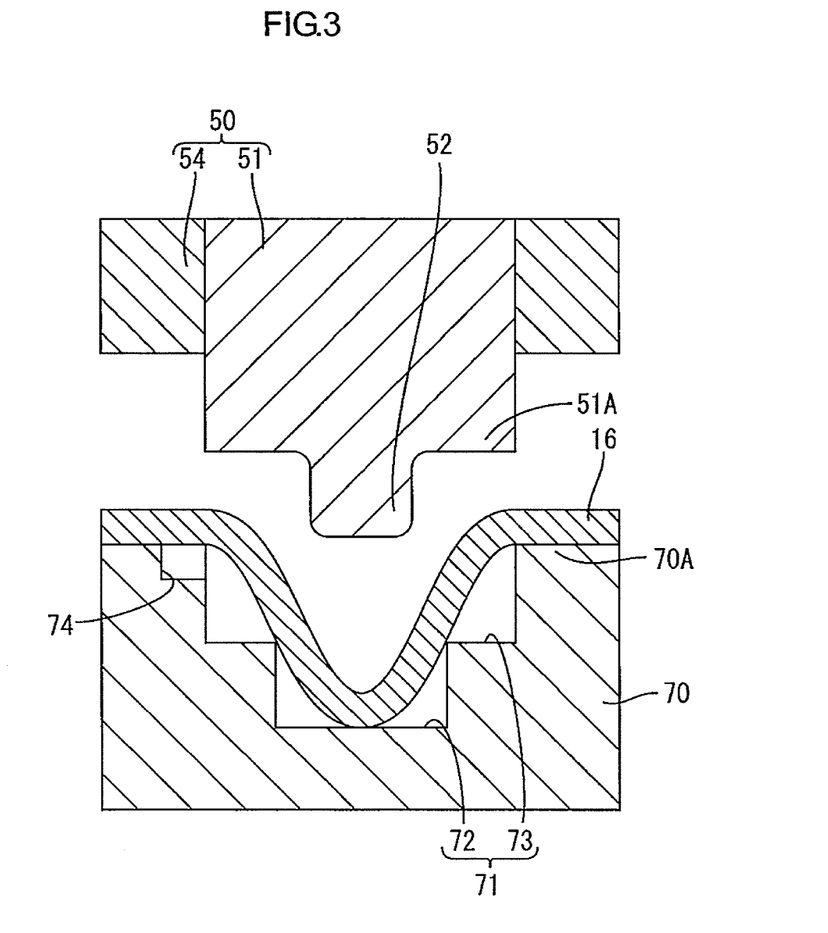
FIG. 3 is a cross-sectional view illustrating an upper die and a lower die with which the resin molded member in FIG. 1 is manufactured.

The resin molded member 10 is manufactured with using an upper die 50 and a lower die 70 (a pair of dies) illustrated in FIG. 3. Next, configurations of the upper die 50 and the lower die 70 will be described. The upper die 50 and the lower die 70 have an elongated shape to mold the elongated resin molded member 10.

As illustrated in FIG. 3, the lower die 70 has a die recess 71 on its facing surface that faces the upper die 50 and the die recess 71 extends along a longitudinal direction of the lower die 70. The die recess 71 includes a first recess portion 72 on its lower portion and a second recess portion 73 on its upper portion.

The second recess portion 73 has an opening area greater than the first recess portion 72 and an opening edge portion of the first recess portion 72 of the lower die 70 constitutes a bottom surface of the second recess portion 73.

The lower die 70 has a runner 74 that communicates with the second recess portion 73. The runner 74 is connected to an injection device (not illustrated) and accordingly, the melted resin is supplied to the second recess portion 73 via the runner 74.

The upper die 50 is a movable-type in which the upper die 50 moves with respect to the lower die 70 (a fixed die) by a driving unit (not illustrated) such as an electric motor, an air cylinder, and a hydraulic cylinder.

The upper die 50 approaches the lower die 70 and this enable the upper die 50 and the lower die 70 to be closed. The upper die 50 moves away from the lower die 70 and this enables the upper die 50 and the lower die 70 to be open.

Figure 4:
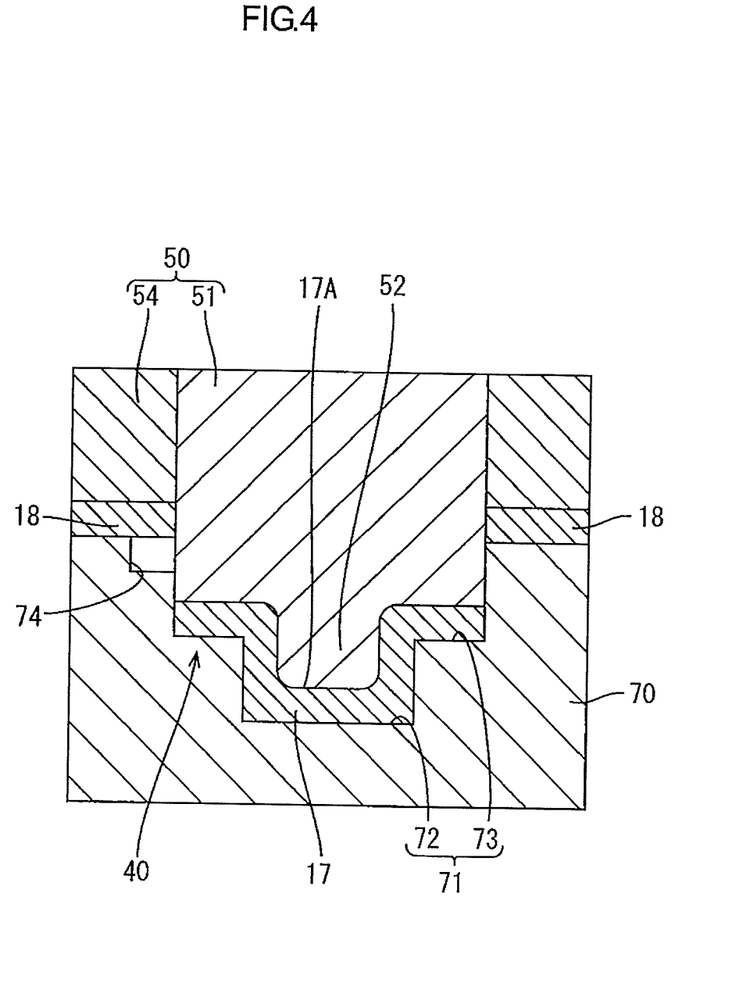
FIG. 4 is a cross-sectional view illustrating a press molding process according to the first embodiment.

Hereinafter, when the upper die 50 and the lower die 70 are closed, they are in a closed state (as illustrated in FIG. 4) and when the upper die 50 and the lower die 70 are open, they are in an open state (as illustrated in FIG. 3).

The upper die 50 includes a first upper die portion 51 and a second upper die portion 54 that are separate components. The first upper die portion 51 is arranged to face the die recess 71. The second upper die portion 54 is provided on outer side with respect to the first upper die portion 51 to have the first upper die portion 51 therebetween and extends along a longitudinal direction of the first upper die portion 51. The first upper die portion 51 has a shape so as to be fitted to the first recess portion 72 of the lower die 70.

A die projection 52 projects from a facing surface of the first upper die portion 51 that faces the lower die 70 toward the lower die 70. The die projection 52 has a shape so as to be fitted to the second recess portion 73. The die projection 52 has a shape that follows a shape of the recess 21 and a shape of a base member recess 17A.

The first upper die portion 51 moves in an upper-and-lower direction with respect to the second upper die portion 54 by a driving unit (not illustrated).

Next, a method of manufacturing the resin molded member 10 will be described. The method of manufacturing the resin molded member 10 according to this embodiment includes a press molding process, a molding space forming process, and an injection molding process. In the press molding process, the molding material 16 is pressed to mold the second molded member 40. In the molding space forming process, a molding space S1 for molding the first molded member 20 is formed. In the injection molding process, a melted resin is injected into the molding space S1 to mold the first molded member 20.

(Press Molding Process)

As illustrated in FIG. 3, in the press molding process, the upper die 50 and the lower die 70 are opened to be in the open state and the molding material 16 is placed on an upper surface of the lower die 70 to cover the die recess 71.

The molding material 16 is formed of a fiber mat obtained by fiber-blending of a thermoplastic resin such as polyamide or polypropylene with a fiber such as a wood fiber, a glass fiber, and a carbon fiber. The obtained fiber mat is molded into a board with thermal molding (preliminary molding) to obtain the molding material 16. Such a fiber mat molded into a board may be called as a pre-board. The pre-board that is molded from a fiber mat is easily transported.

The molding material 16 is heat pressed by a pair of pressing dies (not illustrated) in a previous process that is performed prior to the press molding process and the melt-softened molding material 16 is placed on the lower die 70.

Next, as illustrated in FIG. 4, the upper die 50 and the lower die 70 are closed to be in the closed state. Accordingly, the melt-softened molding material 16 is pressed by the upper die 50 and the lower die 70 therebetween and deforms to follow the shapes of the upper die 50 and the lower die 70.

When the upper die 50 is lowered and the molding material 16 is pressed by the upper die 50 and the lower die 70 therebetween, the molding material 16 is cut into molding base members 18, 18 and a cut base member 17 by a shearing force of the first upper die portion 51 and the lower die 70. Specifically, the molding material 16 is cut into pieces by the shearing force caused between an edge portion 51A of the first upper die portion 51 and a recess opening edge portion 70A of the lower die 70 as illustrated in FIG. 3. End portions of the molding material 16 on its longitudinal side are cut off from the molding material 16 by the lowering of the upper die 50.

The upper die 50 is further lowered such that the molding base members 18, 18 (one part of the molding material) of the molding material 16 are pressed by the second upper die portion 54 and the lower die 70. The cut base member 17 (another part of the molding material) of the molding material 16 is pressed between the die projection 52 of the first upper die portion 51 and the die recess 71 of the lower die 70. Accordingly, the cut base member 17 is formed to have the base member recess 17A that is formed to follow the shape of the die projection 52 of the first upper die portion 51.

According to the press molding process, the cut base member 17 and the molding base members 18, 18 are molded into the second molded member 40.

(Molding Space Forming Process)

Figure 5:
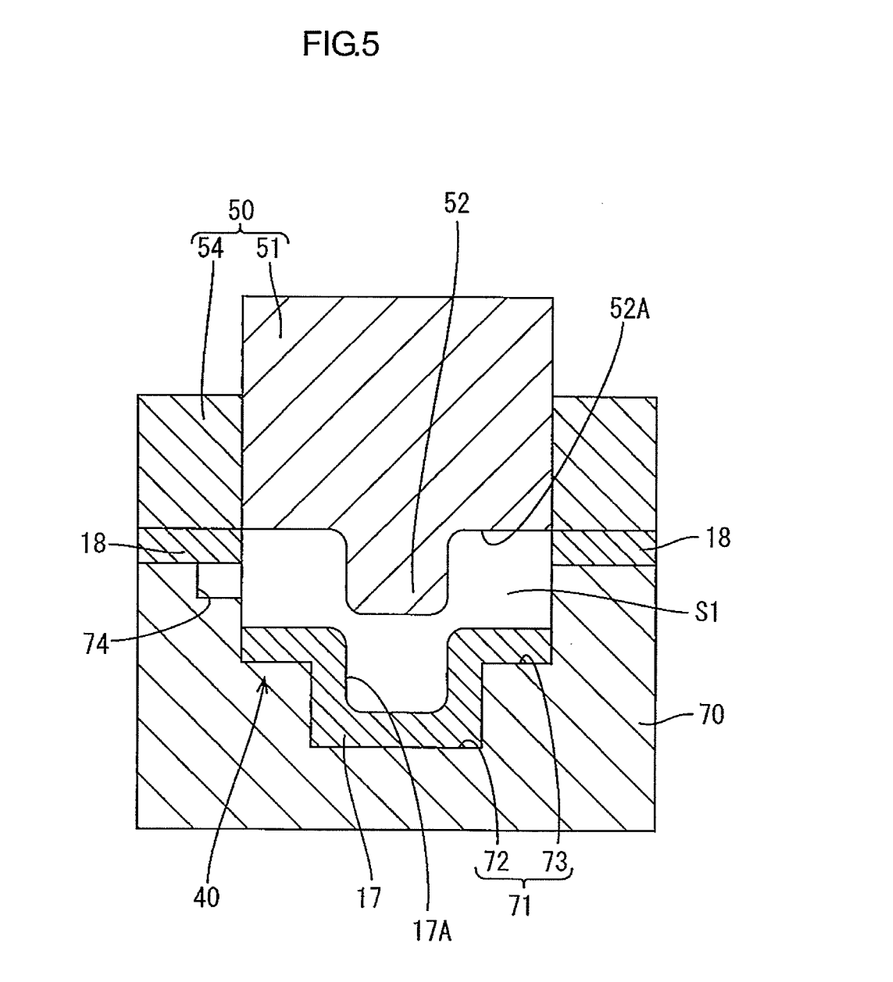
FIG. 5 is a cross-sectional view illustrating a molding space forming process according to the first embodiment.

Next, as illustrated in FIG. 5, the first upper die portion 51 of the upper die 50 is lifted up. Accordingly, the die projection 52 of the first upper die portion 51 is separated away from the cut base member 17. A molding space S1 is generated between a lower surface of the first upper die portion 51 including the die projection 52 and an upper surface of the cut base member 17. The molding space S1 includes a space in the base member recess 17A.

The molding space S1 is defined by the molding base members 18, 18, the first upper die portion 51, the lower die 70, and the cut base member 17. Specifically, as illustrated in FIG. 5, the molding space S1 is defined by cut surfaces of the cut molding base members 18, a projection surface of the first upper die portion 51 from which the die projection 52 projects, an inner surface of the cut base member 17 that is arranged in the die recess 71 of the lower die 70, and inner surfaces of the die recess 71 of the lower die 70 on which no cut base member 17 is arranged. The molding space S1 is formed after cutting the molding material 16. When the molding space S1 is formed, the upper die 50 is lifted up until a surface 52A of a surrounding portion of the die projection 52 of the first upper die portion 51 is on a same plane as the upper surfaces of the molding base members 18, 18.

(Injection Molding Process)

Figure 6:
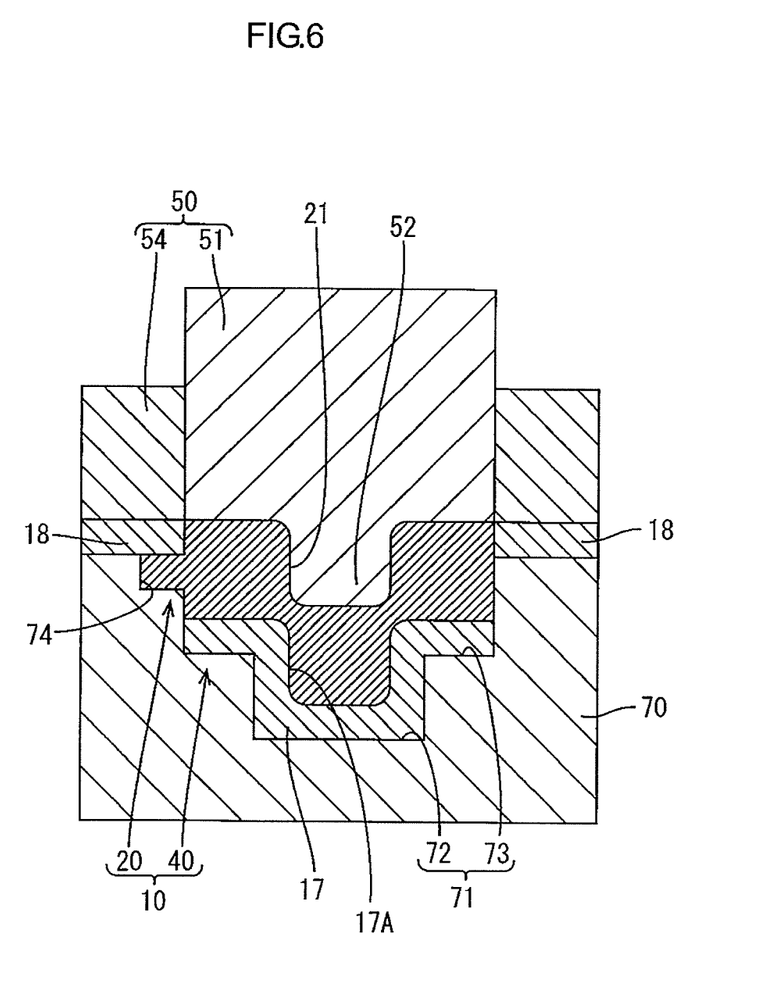
FIG. 6 is a cross-sectional view illustrating an injection molding process according to the first embodiment.

Next, as illustrated in FIG. 6, the melted resin is injected into the molding space S1 through the runner 74. The melted resin in the molding space S1 is mixed with the synthetic resin contained in the molding base members 18, 18 and the cut base member 17 and blended together (mixed with melted).

Thereafter, the melted resin in the molding space S1 is cooled down and accordingly, the first molded member 20 and the second molded member 40 (the cut base member 17 and the molding base members 18, 18) are adhered to each other to be molded. Then, the upper die 50 is lifted up so that the resin molded member 10 is removed from the lower die 70.

Next, advantageous effects of this embodiment will be described. According to this embodiment, the first molded member 20 that is a wall portion having the recess 21 is molded with injection molding. Compared to the method in which the recess is molded with press molding, the recess 21 is precisely molded with a desired dimension according this embodiment. If the recess 21 is molded with press molding, the base member material is pressed by the dies and greatly expands to form the recess. This lowers the density of the base member material containing resin and lack of a part of the base member material near the edge portion of the recess may occur or a part of the base member material may be thinner than other parts. Therefore, the recess may not be precisely molded and may not be formed to have a shape following the die projection of the die. According to this embodiment, the recess 21 is molded with injection molding, and therefore the base member material is not greatly expanded.

In the resin molded member 10 according to this embodiment, the base member recess 17A that is molded by expanding the molding material 16 with press molding is formed as a recess in the base member of the second molded member 40, and the first molded member 20 is molded on the second molded member 40 with injection molding such that the recess 21 of a desired depth is molded. Therefore, even if a deep recess 21 may be molded, the base member recess 17A does not necessarily have a great depth, and accordingly, the molding material 16 is expanded by only a short length to mold the base member recess 17A. The density of the molding material 16 is less likely to be lowered and a thin part or lack of a part is less likely to be generated near the edge portion of the base member recess 17A. Even if lack of a part of the molding material 16 occurs or a part of the molding material 16 becomes thinner than other parts during the press molding for molding the base member recess 17A, the resin is injected into the molding space S1 to mold the recess 21 with covering the lack of the part of the molding material 16 or the thinner part with the injected resin. Therefore, the recess 21 is precisely molded without being affected by the lack of a part or the thinner part of the molding material 16.

If a deep recess is molded with press molding, the density of the base material containing a resin is lowered and the density is especially lowered in a part of the base material near the recess. Accordingly, lack of the part of the base material near the recess is likely to occur and it is troublesome to form a deep recess. According to this embodiment, the base member recess 17A is molded in the molding material 16 with press molding, and the recess 21 is molded on the second molded member 40 including the base member recess 17A with injection molding. Therefore, a deep recess 21 can be molded precisely, and wide variety of molding is enabled.

The second molded member 40 of the resin molded member 10 that corresponds to the portion other than the first molded member 20 is constituted by the molding material 16 containing fibers. This increases mechanical strength of the second molded member 40.

In the press molding process, the cut base member 17 (another portion of the molding material) is molded with press molding between the die projection 52 of the upper die 50 (one die) and the die recess 71 of the lower die 70 (another die). In the molding space forming process that is executed after the press molding process, the upper die 50 is lifted up so that the die projection 52 moves away from the cut base member 17 and the molding space S1 is generated between the die projection 52 and the cut base member 17. Thereafter, in the injection molding process, the molding space S1 is filled with the melted resin to mold the first molded member 20.

Accordingly, the cut base member 17 is integrally molded with the first molded member 20. This enforces the first molded member 20 with the cut base member 17. The cut base member 17 contains fibers and this effectively enforces the first molded member 20.

According to this embodiment, since the second molded member 40 contains fibers, it is troublesome to process with injection molding. Therefore, according to this embodiment, the second molded member 40 is molded with press molding and the first molded member 20 having the recess 21 is molded with injection molding.

Second Embodiment

Next, a second embodiment according to the present technology will be described with reference to FIGS. 7 to 9. This embodiment is different from the first embodiment in configurations of a resin molded member 110, an upper die 150, and a lower die 170.

Figure 9:
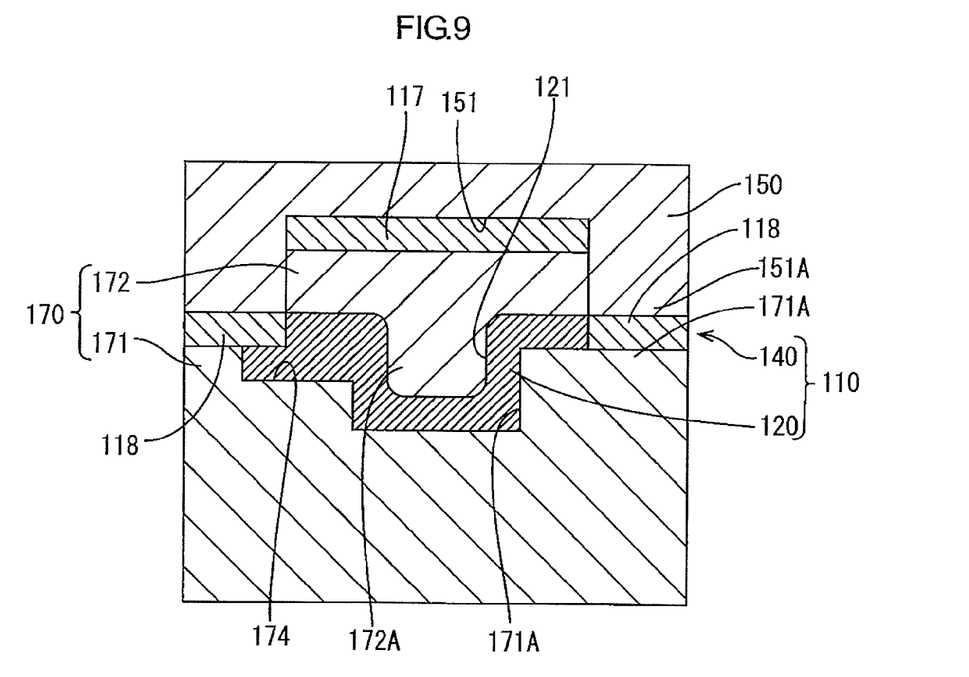
FIG. 9 is a cross-sectional view illustrating an injection molding process according to the second embodiment.

As illustrated in FIG. 9, the resin molded member 110 has a substantially plate shape as a whole. The resin molded member 110 includes a first molded member 120 (an injection molded member) and a second molded member 140 (a press molded member). The first molded member 120 includes a recess 121 that is open toward a front side (a design surface side). The second molded member 140 is molded integrally with the first molded member 120.

Figure 7:
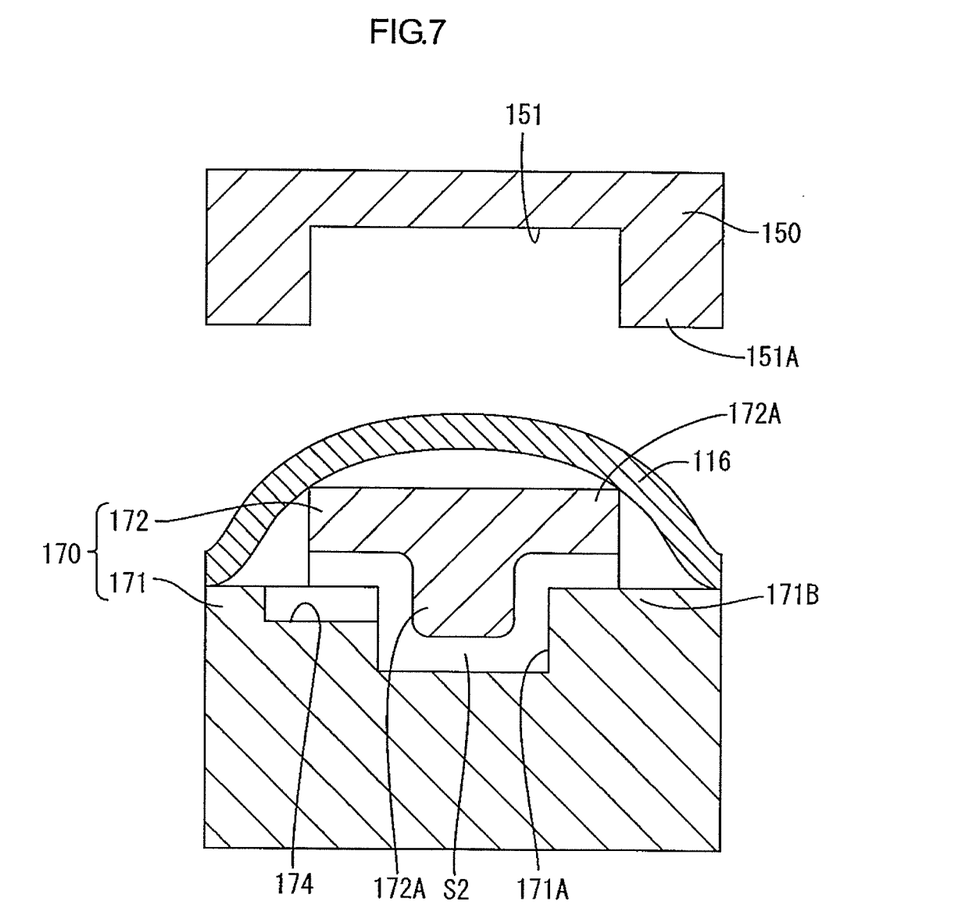
FIG. 7 is a cross-sectional view illustrating an upper die and a lower die according to a second embodiment of the present technology.

The resin molded member 110 is manufactured with using an upper die 150 and a lower die 170 (a pair of dies) as illustrated in FIG. 7. Next, configurations of the upper die 150 and the lower die 170 will be described. The upper die 150 and the lower die 170 have an elongated shape to mold an elongated molded member 110.

The lower die 170 includes a main body 171 and a movable body 172. The main body 171 has a main body recess 171A formed to be recessed in an upper surface thereof and the main body recess 171A has an elongated shape. The movable body 172 is arranged above the main body 171. The main body recess 171A, the main body 171 and the movable body 172 have an elongated shape.

The movable body 172 projects upwardly from the main body 171. The movable body 172 is arranged to move slidably with respect to the main body 171 along an elongated direction of the main body recess 171A (a direction through the sheet of FIG. 7).

The movable body 172 includes a movable body projection 172A on its lower surface so as to project toward the main body recess 171A. The movable body projection 172A has a shape that follows a shape of the recess 121. A gap space S2 that follows a shape of the first molded member 120 is formed between the movable body 172 and the main body 171. The gap space S2 is a molding space S2 where the first molded member 120 is molded.

As described before, the movable body 172 projects upwardly than the main body 171. The movable body 172 constitutes a projection (die projection) of the lower die 170 and the gap space S2 is formed below the movable body 172. The gap space S2 is formed in a portion of the lower die 170 from which the movable body projection 172A projects.

The lower die 170 includes a runner 174 that communicates with the gap space S2. The runner 174 is connected to an injection device (not illustrated) and the gap space S2 is supplied with the melted resin via the runner 174.

The upper die 150 includes an upper die recess 151 (a molding recess) on its facing surface that faces the lower die 170. The movable body 172 is fitted to the upper die recess 151.

The upper die 150 is capable of approaching and moving away from the lower die 170 (a fixed die) by a driving device such as an electric motor, an air cylinder, or a hydraulic cylinder. The movable body 172 of the lower die 170 is capable of sliding with respect to the main body 171 by a driving device such as an electric motor, an air cylinder, and a hydraulic cylinder.

The driving force of the upper die 150 may be transferred to the movable body 172 via a cam sliding mechanism so that the movable body 172 may be driven.

Next, a method of manufacturing the resin molded member 110 will be described. The method of manufacturing the resin molded member 110 according to this embodiment includes a press molding process and an injection molding process. In the press molding process, a molding material 116 is pressed to mold the second molded member 140. In the injection molding process, the melted resin is injected into the molding space S2 (the gap space S2) that is formed in the lower die 170 to mold the first molded member 120.

(Press Molding Process)

As illustrated in FIG. 7, in the press molding process, the upper die 150 and the lower die 170 are open to be in the open state and the molding material 116 (pre-board) is arranged on an upper surface of the lower die 170. The molding material 116 is placed on the movable body 172 of the lower die 170.

The molding material 116 is pressed with heated by a pair of press dies (not illustrated) in a heating process prior to the press molding process, for example. Thus melt-softened molding material 16 is arranged on the lower die 170.

Figure 8:
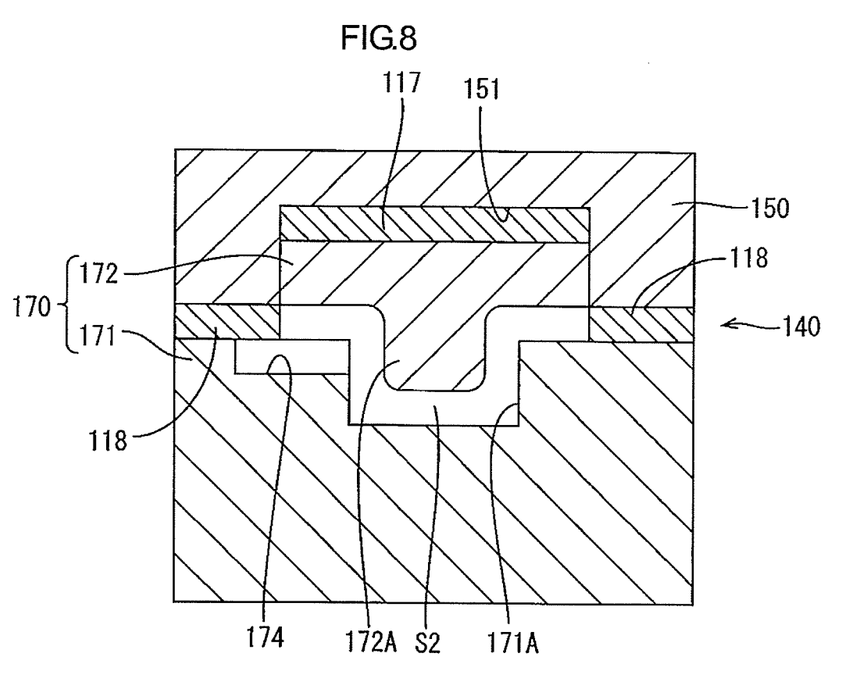
FIG. 8 is a cross-sectional view illustrating a press molding process according to the second embodiment.

Next, as illustrated in FIG. 8, the upper die 150 and the lower die 170 are closed. Accordingly, the melt-softened molding material 116 is pressed by the upper die 150 that is lowered and deformed to follow a shape of the upper die 150 and the lower die 170. Namely, the molding material 116 is deformed to have a shape following the molding base members 118, 118 and the cut base member 117.

When the upper die 150 is lowered, the molding material 116 is cut into molding base members 118, 118 and the cut base member 117 by a shearing force of the upper die 150 and the movable body 172. Specifically, the molding material 116 is cut into pieces by the shearing force caused between a recess opening edge portion 151A of the upper die recess 151 and an edge portion 172A of the movable body 172 of the lower die 170 as illustrated in FIG. 7. End portions of the molding material 116 on its longitudinal side are cut off from the molding material 116 by the lowering of the upper die 150. According to this embodiment, the cut base member 117 does not constitute the resin molded member 110.

The upper die 150 is further lowered such that the molding base members 118, 118 (one part of the molding material) of the molding material 116 are pressed by the recess opening edge portion 151A of the upper die recess 151 (a molding recess) and an outer part 171B of the main body 171 that is on an outer side or a surrounding part with respect to the movable body 172 (a surrounding part with respect to a die projection). Accordingly, the molding base members 118, 118 are molded with press molding to constitute the second molded member 140.

The molding base members 118, 118 cover the end portions of the gap space S2, and this enables the gap space S2 to be a closed space to generate the molding space S2. As illustrated in FIG. 8, the molding space S2 is defined by cut end surfaces of the cut molding base members 118, a projection surface of the movable body 172 from which the movable body projection 172A projects, and an inner surface of the main body recess 171A of the lower die 170. The molding space S2 is generated by cutting the molding material 116.

The cut base member 117 (another portion of the molding material) of the molding material 116 is pressed by the upper die recess 151 of the upper die 150 and the movable body 172 therebetween.

(Injection Molding Process)

Next, as illustrated in FIG. 9, the melted resin is injected into the molding space S2 via the runner 174. The melted resin supplied to the molding space S2 is mixed with a synthetic resin contained in the molding base members 118, 118 and blended together (mixed with melted).

Thereafter, the melted resin in the molding space S2 is cooled down and accordingly, the first molded member 120 and the second molded member 140 are integrally molded as one part. Next, after the movable body 172 is slid to move away from the resin molded member 110, the resin molded member 110 is removed from the dies. This completes a process of manufacturing the resin molded member 110.

According to this embodiment, the gap space S2 (the molding space S2) used for injection molding is generated in the lower die 170. Accordingly, an exclusive process of generating the molding space S2 (the molding space forming process) is not necessary and this improves manufacturing efficiency.

According to this embodiment, the cut base member 117 is not included integrally with the first molded member 120. With such a configuration, in the injection molding process, the melted resin injected into the molding space S2 is not absorbed by the cut base member 117 and accordingly, the injection amount of the melted resin that is required to mold the first molded member 120 is easily controlled.

Other Embodiments

The present technology is not limited to the description as described above with reference to the drawings. For example, the present technology may include following embodiments.

(1) The resin molded members 10, 110 are not necessarily formed in the shapes as described in the above embodiments. The shape of the resin molded member may be modified as long as the resin molded member includes at least a recess. The resin molded members 10, 110 are not necessarily used for vehicles but may be any other objects.

(2) In the above embodiments, a pair of dies includes the upper die and the lower die, however, the present technology is not limited thereto. The direction in which the pair of dies is opened and closed is not limited to an up-down direction and may be any other direction. For example, the direction in which the pair of dies is opened and closed may be a horizontal direction.

(3) In the above embodiments, the pre-board is described as the molding material, however, the present technology is not limited thereto. A fiber mat may be used as the molding material and the fiber mat may be pressed between the upper die and the lower die in the press molding process.

What is claimed is:

1. A method of manufacturing a resin molded member having a recess, the method comprising:
  a press molding process including:
    placing a flat plate shaped molding material containing fibers and a thermoplastic resin between a pair of dies, one of the dies having a die projection and the other of the dies having a die recess;
    moving at least one of the dies;
    cutting the molding material by a shearing action of the dies caused by the moving into a pair of one parts and a second part that is between the pair of one parts; and
    pressing the molding material between the dies by the moving, and
  an injection molding process including:
    injecting a melted resin into a molding space that is formed between the dies and a cut surface of each of the pair of one parts that faces the molding space after the cutting of the molding material; and
    molding a wall portion having a recess from the melted resin injected into the molding space such that the wall portion is integral with at least the pair of one parts of the molding material that is cut off in the cutting.

2. The method according to claim 1, wherein
the press molding process further includes:
  pressing the second part of the molding material that is cut off in the cutting, pressing the second part between the die projection included in the-one die and the die recess included in the other die, and
the method further comprising:
  a molding space forming process performed after the press molding process, the molding space forming process including:
    moving the one die having the die projection away from the second part of the molding material that is arranged in the die recess after the pressing; and
    forming the molding space between the die projection and the second part of the molding material that is arranged in the die recess by the moving.

3. The method according to claim 2, wherein
in the placing, placing the molding material on the other die having the die recess to cover the die recess, and
in the moving of the press molding process, moving the one die having the die projection to be closer to the other die.

4. The method according to claim 2, wherein
the molding space is defined by cut surfaces of the pair of one parts of the molding material, a projection surface of the one die from which the die projection projects, an inner surface of the second part of the molding material that is arranged in the die recess of the other die, and inner surfaces of the die recess of the other die on which the second part of the molding material is not arranged.

5. The method according to claim 2, wherein
the one die having the die projection includes two separate parts including a first die portion having the die projection and a second die portion, and
in the moving of the molding space forming process, moving only the first die portion away from the second part of the molding material that is arranged in the die recess after the pressing and cutting.

6. The method according to claim 5, wherein the press molding process further includes:
  pressing the pair of one parts of the molding material that is cut off in the cutting, pressing the pair of one parts between the second die portion and a recess opening edge portion of the other die, wherein
  the pair of one parts of the molding material is pressed between the second die portion and the recess opening edge portion while and after the first die portion moves away from the other part of the molding material.

7. The method according to claim 1, wherein
the press molding process further includes:
  pressing the second part of the molding material that is cut off in the cutting, pressing the second part between the die projection included in the one die and the die recess included in the other die; and
  pressing the pair of one parts of the molding material that is cut off, pressing the pair of one parts between a recess opening edge portion of the die recess and a peripheral portion of the one die, the peripheral portion being on an outer side with respect to the die projection, and
the molding space is formed in a portion of the one die from which the die projection projects.

8. The method according to claim 7, wherein
the one die includes the die projection and a main body from which the die projection projects, and the die projection has a projection on a surface facing the main body and the main body has a recess on a surface facing the die projection such that the molding space is formed between the die projection and the main body.

9. The method according to claim 8, wherein
the molding space is defined by cut end surfaces of the pair of one parts of the molding material, the surface of the die projection that faces the main body and from which the projection projects, and an inner surface of the recess of the main body so that the second part of the molding material that is cut off is not molded integrally with the wall portion with the injected resin.

10. The method according to claim 8, wherein
in the placing, placing the molding material on the one die having the die projection to cover the die projection, and
in the moving of the press molding process, moving the other die having the die recess to be closer to the one die.

11. The method according to claim 1, wherein
the press molding process further includes pressing the second part of the molding material that is cut off in the cutting between the die projection included in the one die and the die recess included in the other die to form a base member recess in the second part of the molding material, and in the injection molding process, the wall portion is molded by the injecting of the melted resin into the molding space including a space in the base member recess.

12. The method according to claim 1, wherein
in the injection molding process, a portion of the second part and the cut surfaces of the pair of one parts face the molding space.

13. The method according to claim 1, wherein
the pair of one parts is a pair of molding base members,
the second part is a cut base member,
in the cutting, the molding material is cut into the pair of molding base members and the cut base member, and the cut base member is disposed between the molding base members, and
the at least one of the dies that is moved in the cutting is the same die as the at least one of the dies that is moved in the pressing where the molding base members and the cut base member are pressed between the dies.

* * * * *